(12) United States Patent
Wu (10) Patent No.: US 10,599,238 B1
(45) Date of Patent: Mar. 24, 2020

(54) SCROLL MOUSE WITH PLURALITY OF WEIGHTING ELEMENTS

(71) Applicant: Primax Electronics Ltd., Taipei (TW)

(72) Inventor: Chun-Che Wu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/263,995

(22) Filed: Jan. 31, 2019

(30) Foreign Application Priority Data

Nov. 30, 2018 (TW) .............................. 107143049 A (51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC .... G06F 3/0362; G06F 3/03543; B60B 19/06
See application file for complete search history.

(56) References Cited

U.S. PATENT DOCUMENTS

| 4,503,635 A * | 3/1985 | Harrington ............ A63H 33/18 446/46 |
| 5,507,512 A * | 4/1996 | Donoghue ............... B62M 1/10 280/217 |
| 7,733,328 B2 * | 6/2010 | Blandin .............. G06F 3/03543 345/156 |
| 2017/0144490 A1* | 5/2017 | Maejima ............. B60C 11/1656 |

FOREIGN PATENT DOCUMENTS

| CN | 205896031 U * | 1/2017 | .............. F16F 15/30 |
| WO | WO-2015061703 A1 * | 4/2015 | .............. F03G 6/003 |

\* cited by examiner

*Primary Examiner* — Laurence J Lee
(74) *Attorney, Agent, or Firm* — Kirton McConkie; Evan R. Witt (57) ABSTRACT

A scroll mouse includes a casing and a scroll wheel module. The casing includes an opening. The scroll wheel module is disposed within the casing, penetrated through the opening, and partially exposed outside the casing. The scroll wheel includes a wheel body and plural weighing elements. The wheel body is disposed within the casing and rotatable relative to the casing. The wheel body includes plural receiving recesses. The plural receiving recesses are formed in the wheel body. The plural weighing elements correspond to the plural receiving recesses. The plural weighing elements are received within the corresponding receiving recesses to increase a weight of the wheel body. A material density of each weighing element is larger than a material density of the wheel body.

9 Claims, 7 Drawing Sheets

SCROLL MOUSE WITH PLURALITY OF WEIGHTING ELEMENTS

FIELD OF THE INVENTION

The present invention relates to an input device, and more particularly to a scroll mouse.

BACKGROUND OF THE INVENTION

A mouse device is one of the widely-used computer peripheral input devices. When a mouse device is held by the palm of a user, the user may move the mouse device to control the movement of a cursor of the computer system. The mouse device complies with the intuitive operating habits of many users. Consequently, the mouse device is the most prevailing input device.

Figure 1:
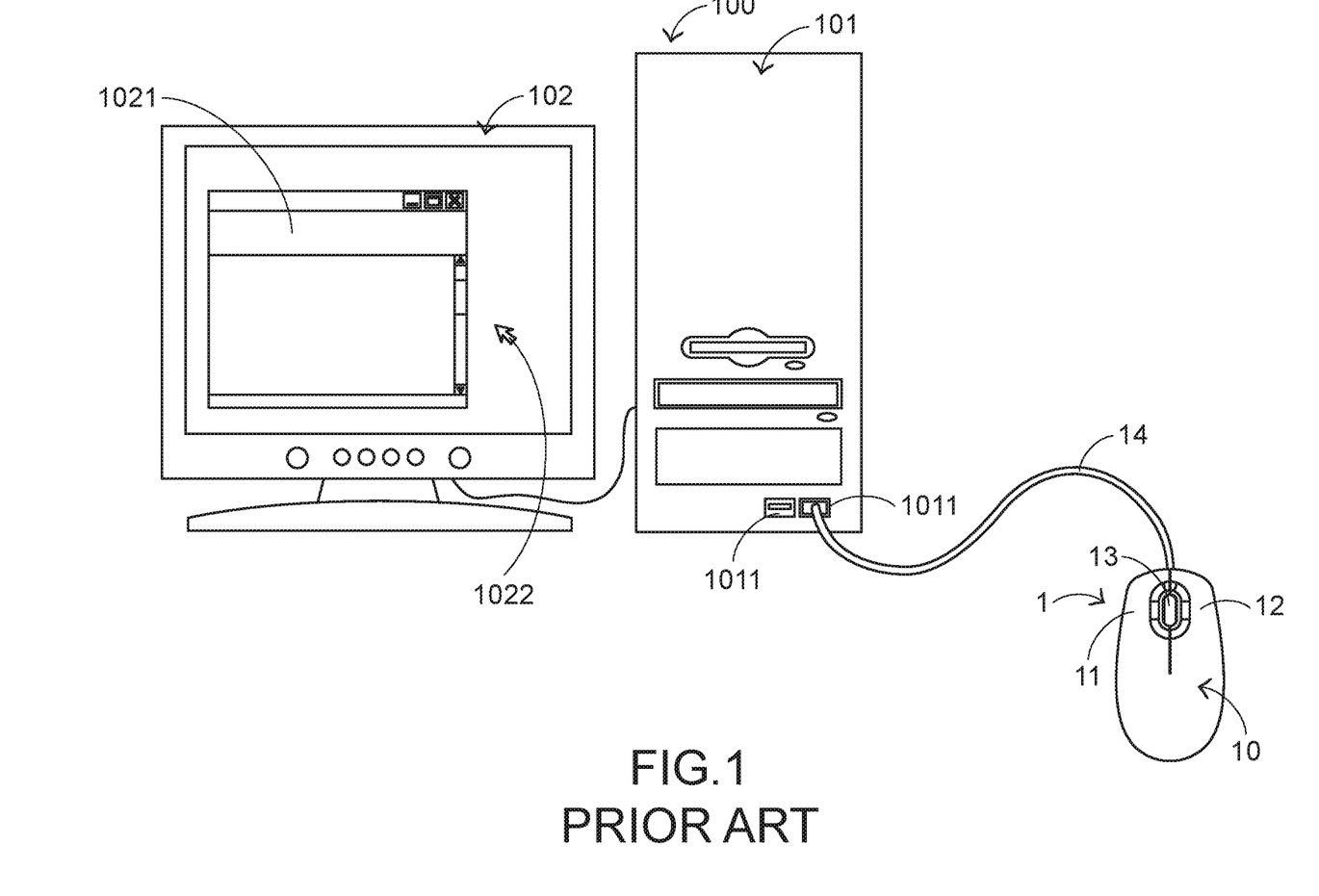
FIG. 1 is a schematic diagram illustrating the connection between a conventional mouse device and a computer system.

The structure and the function of a conventional mouse device will be described as follows. FIG. 1 schematically illustrates the connection between a conventional mouse device and a computer system. The computer system 100 comprises a computer host 101 and a display screen 102. The computer host 101 is in communication with a mouse device 1 and the display screen 102. The computer host 101 has a connecting port 1011. A graphic-based window 1021 and a cursor 1022 are shown on the display screen 102. The mouse device 1 is used for controlling the movement or operation of the cursor 1022. Consequently, the computer host 101 executes a corresponding command. The mouse device 1 comprises a casing 10, a left button 11, a right button 12, a scroll wheel 13, and a connecting cable 14. The left button 11 is disposed on the casing 10 and arranged beside a left side of the scroll wheel 13. In addition, the left button 11 is exposed outside the casing 10. When the left button 11 is pressed down, a left button signal is generated. Like the left button 11, the right button 12 is disposed on the casing 10 and arranged beside a right side of the scroll wheel 13. The right button 12 is also exposed outside the casing 10. When the right button 12 is pressed down, a right button signal is generated. The scroll wheel 13 is disposed within the casing 10 and partially exposed outside the casing 10. When the scroll wheel 13 is rotated by the user, a corresponding scrolling data is generated. After the scrolling data is transmitted to the computer host 101, the computer host 101 performs an operation of scrolling the graphic-based window 1021 upwardly or downwardly according to the scrolling data. The connecting cable 14 is disposed within the casing 10 and protruded outside the casing 10. When the connecting cable 14 is connected with the connecting port 1011, the communication between the mouse device 1 and the computer system 100 is established.

The conventional mouse device 1 comprises a switching module (not shown). By operating the switching module, the stepped motion in response to the rotation of the scroll wheel 13 is correspondingly changed. The structure of the switching module is known to those skilled in the art, and is not redundantly described herein.

When the switching module is operated to control the scroll wheel 13 to be in a stepped motion mode, the scroll wheel 13 is rotated for one graduation in response to one-unit rotation of the user. Consequently, the mouse device 1 generates a one-graduation scrolling data. After the computer host 101 receives the one-graduation scrolling data, the computer host 101 performs a one-graduation window scrolling function. When the switching module is operated to control the scroll wheel 13 to be in a non-stepped motion mode (i.e., a so-called hyper-fast mode), the scroll wheel 13 is continuously rotated for plural graduations in response to one-unit rotation of the user. That is, the scroll wheel 13 is rotated at a high speed. According to settings, the mouse device 1 realizes that the scroll wheel 13 is in the non-stepped motion mode. Consequently, the mouse device generates default high-speed scrolling data. After the computer host 101 receives the high-speed scrolling data, the computer host 101 performs a high-speed window scrolling function.

Nowadays, the demands on the rotating speed of the scroll wheel and the time length of continuously rotating the scroll wheel are increased. Therefore, there is a need of providing a scroll mouse capable of increasing the rotating speed of the scroll wheel and extending the time length of continuously rotating the scroll wheel.

SUMMARY OF THE INVENTION

The present invention provides a scroll mouse capable of increasing the rotating speed of the scroll wheel and extending the time length of continuously rotating the scroll wheel.

In accordance with an aspect of the present invention, there is provided a scroll mouse. The scroll mouse includes a casing and a scroll wheel module. The casing includes an opening. The scroll wheel module is disposed within the casing, penetrated through the opening, and partially exposed outside the casing. The scroll wheel includes a wheel body and plural weighing elements. The wheel body is disposed within the casing and rotatable relative to the casing. The wheel body includes plural receiving recesses. The plural receiving recesses are circumferentially formed in the wheel body. The plural weighing elements correspond to the plural receiving recesses. The plural weighing elements are received within the corresponding receiving recesses to increase a weight of the wheel body. A material density of each weighing element is larger than a material density of the wheel body.

In an embodiment, the wheel body includes an accommodation channel, plural graduation parts, a main part and a covering part. The plural graduation parts are disposed on an inner surface of the accommodation channel. The accommodation channel, the plural graduation parts and the plural receiving recesses are located at the main part. The covering part and the main part are combined together to form the wheel body. The covering part comprises plural concave structures. After the plural weighing elements are received within the corresponding receiving recesses and the covering part and the main part are combined together, positions of the plural weighing elements are limited by the corresponding receiving recesses. Consequently, the plural weighing elements are not detached from the corresponding receiving recesses.

From the above descriptions, the present invention provides a scroll mouse. Since the plural weighing elements are accommodated within the wheel body, the weight of the wheel body is increased. When compared with the conventional mouse device, the rotating speed of the wheel body of the present scroll wheel module is faster and the time length of continuously rotating the wheel body at the high speed is longer.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides a scroll mouse.

Figure 2:
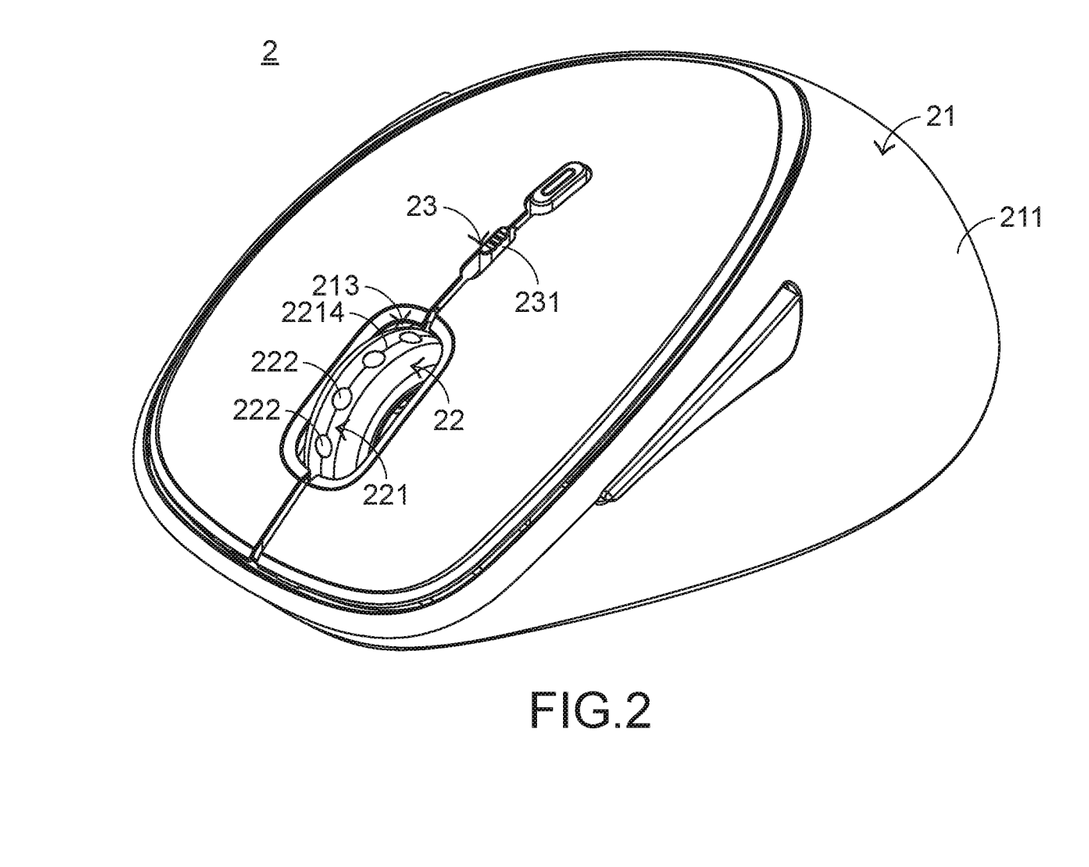
FIG. 2 is a schematic perspective view illustrating the outer appearance of a scroll mouse according to a first embodiment of the present invention.
Figure 3:
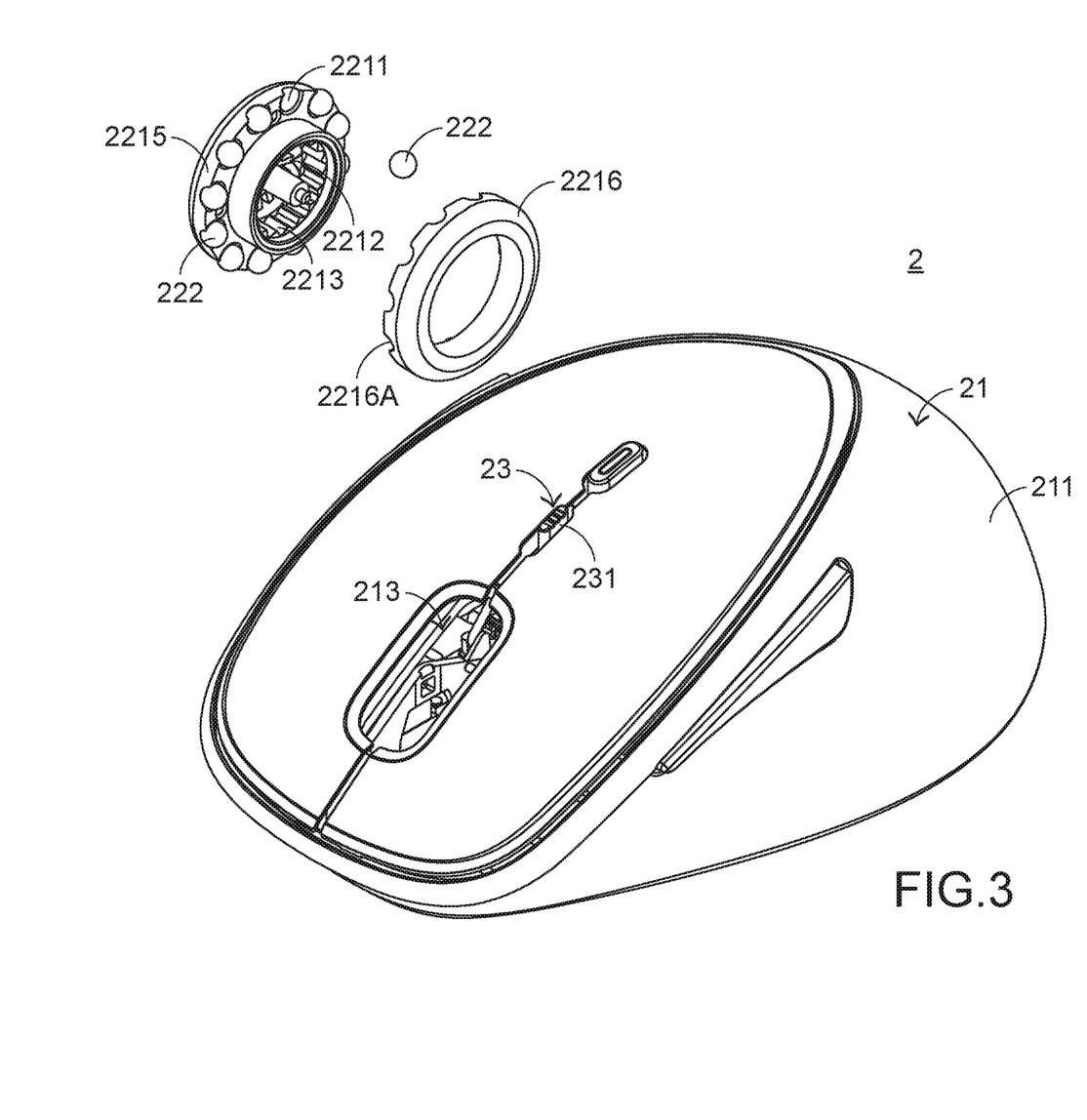
FIG. 3 is a schematic exploded view illustrating a portion of the scroll mouse according to the first embodiment of the present invention.

Hereinafter, the structure of the scroll mouse of the present invention will be illustrated with reference to FIGS. 2 and 3. FIG. 2 is a schematic perspective view illustrating the outer appearance of a scroll mouse according to a first embodiment of the present invention. FIG. 3 is a schematic exploded view illustrating a portion of the scroll mouse according to the first embodiment of the present invention. In this embodiment, the scroll mouse 2 comprises a casing 21, a scroll wheel module 22 and a switching module 23. The casing 21 comprises a top cover 211, a base 212 and an opening 213. The top cover 211 is located over the base 212 to cover the base 212. The opening 213 is formed in the top cover 211. The scroll wheel module 22 is disposed within the casing 21. That is, the scroll wheel module 22 is arranged between the top cover 211 and the base 212. Moreover, the scroll wheel module 22 is penetrated through the opening 213 and partially exposed outside the casing 21. The scroll wheel module 22 comprises a wheel body 221 and plural weighing elements 222. The wheel body 221 is disposed within the casing 21 and rotatable relative to the casing 21. The wheel body 221 comprises plural receiving recesses 2211, an accommodation channel 2212 and plural graduation parts 2213. The plural receiving recesses 2211 are circumferentially formed in a poking surface 2214 of the wheel body 221. The plural graduation parts 2213 are disposed on an inner surface of the accommodation channel 2212. The plural weighing elements 222 are aligned with the plural receiving recesses 2211, respectively. Moreover, the plural weighing elements 222 are received within the corresponding receiving recesses 2211. The uses of the weighing elements 222 can increase the weight of the wheel body 221. Consequently, the rotating speed of the wheel body 221 is increased. Moreover, the material density of the weighing element 222 is larger than the material density of the wheel body 221.

In an embodiment, the wheel body 221 is made of plastic material, and the weighing element 222 is made of metallic material, glass material or ceramic material. Moreover, the weighing element 222 has a spherical shape, and the receiving recess 2211 is the spherical recess corresponding to the weighing element 222. It is noted that numerous modifications or alternations may be made while retaining the teachings of the present invention. For example, in another embodiment, the weighing element has a cubic shape or any other appropriate shape, and the receiving recess has a shape matching the weighing element. Preferably, the plural receiving recesses 2211 are discretely arranged on the poking surface 2214 of the wheel body 221 at regular intervals. Consequently, the weights of the weighing elements 222 are uniformly exerted on the wheel body 221. The user's finger may be placed on the poking surface 2214 of the wheel body 221.

An example of the wheel body 221 has the following structure. The wheel body 221 comprises a main part 2215 and a covering part 2216. The plural receiving recesses 2211, the accommodation channel 2212 and the plural graduation parts 2213 are located at the main part 2215. After the main part 2215 and the covering part 2216 are combined together, the wheel body 221 is formed. The covering part 2216 comprises plural concave structures 2216A. The plural concave structures 2216A are aligned with the plural receiving recesses 2211, respectively. After the weighing elements 222 are placed in the corresponding receiving recesses 2211 and the covering part 2216 is combined with the main part 2215, the plural concave structures 2216A are contacted with the corresponding receiving recesses 2211. Since the moving actions of the weighing elements 222 are limited by the peripheries of the plural concave structures 2216A and the corresponding receiving recesses 2211, the weighing elements 222 are not detached from the receiving recesses 2211. It is noted that numerous modifications and alterations may be made while retaining the teachings of the invention. For example, in another embodiment, the wheel body has a one-piece structure. After a bonding agent is dispensed into the plural receiving recesses, the weighing elements are placed into the corresponding receiving recesses. Consequently, the weighing elements are fixed in the corresponding receiving recesses through the bonding agent.

Figure 4:
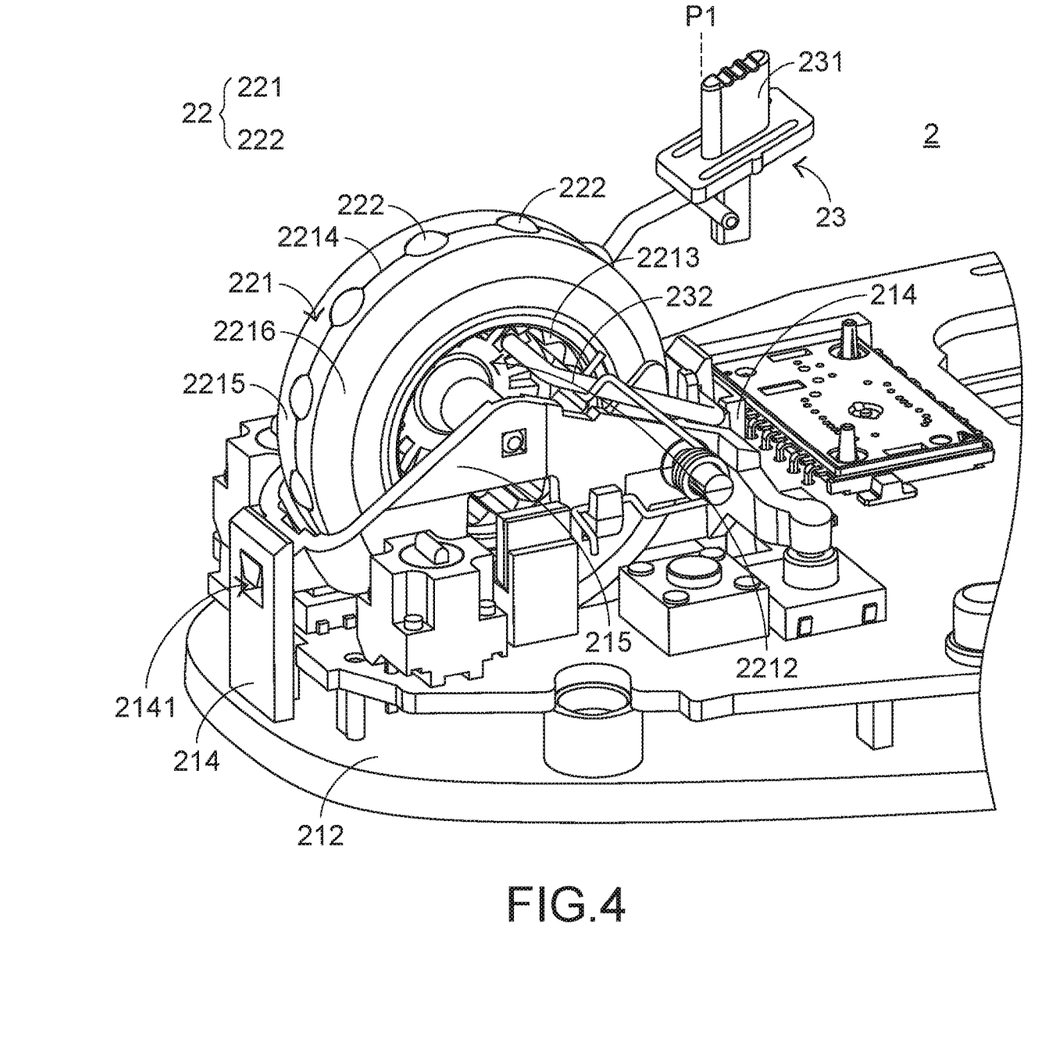
FIG. 4 is a schematic perspective view illustrating a portion of the scroll wheel module of the scroll mouse according to the first embodiment, in which the scroll wheel module is in a first rotation mode.

FIG. 4 is a schematic perspective view illustrating a portion of the scroll wheel module of the scroll mouse according to the first embodiment, in which the scroll wheel module is in a first rotation mode. Please refer to FIGS. 3 and 4. The casing 21 further comprises plural fixing posts 214 and a supporting seat 215. The plural fixing posts 214 are protruded upwardly from the base 212 of the casing 21. Each fixing post 214 has a fixing hole 2141. The supporting seat 215 is penetrated through the plural fixing holes 2141. Two ends of the supporting seat 215 are connected with the corresponding fixing posts 214. The supporting seat 215 is used for supporting the wheel body 221. Consequently, the wheel body 221 is rotatable relative to the supporting seat 215. Moreover, the supporting seat 215 is movable relative to the fixing posts 214 along a vertical direction.

Generally, a switch is located under the supporting seat 215 or located under a neighboring region of the supporting seat 215. When the scroll wheel module 22 is pressed down, the supporting seat 215 is moved downwardly relative to the plural fixing posts 214 so as to press the switch. Consequently, a scroll button signal is generated. The techniques about the switch and the scroll button signal are well known to those skilled in the art, and are not redundantly described herein.

In FIGS. 3 and 4, the switching module 23 is shown. The user may operate the switching module 23 to change the rotation mode of the scroll wheel module 22. In this embodiment, the switching module 23 comprises an adjusting key 231 and a switching arm 232. The adjusting key 231 is disposed on the top cover 211 of the casing 21 and partially exposed outside the top cover 211. Consequently, the adjusting key 231 can be operated by the user. For example, by moving the position of the adjusting key 231, the rotation mode of the scroll wheel module 22 is changed. The switching arm 232 is arranged between the top cover 211 and the base 212. A first end of the switching arm 232 is connected with the adjusting key 231. A second end of the switching arm 232 is inserted into the accommodation channel 2212. By moving or swinging the switching arm 232, the rotation mode of the scroll wheel module 22 is correspondingly changed.

Figure 5:
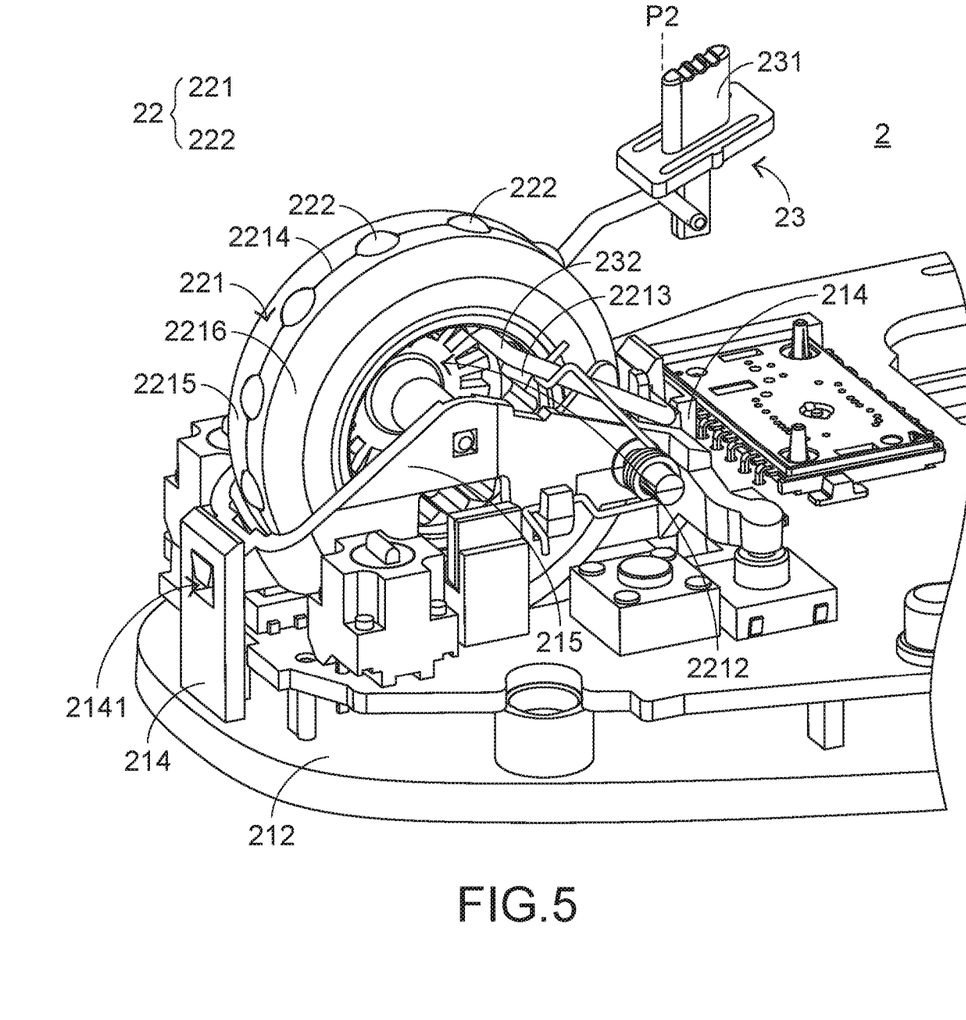
FIG. 5 is a schematic perspective view illustrating a portion of the scroll wheel module of the scroll mouse according to the first embodiment, in which the scroll wheel module is in a second rotation mode.

FIG. 5 is a schematic perspective view illustrating a portion of the scroll wheel module of the scroll mouse according to the first embodiment, in which the scroll wheel module is in a second rotation mode. Please refer to FIGS. 4 and 5. While the adjusting key 231 is moved to a first position P1, the first end of the switching arm 232 is correspondingly swung with the adjusting key 231, and the second end of the switching arm 232 is swung within the accommodation channel 2212. Consequently, the second end of the switching arm 232 is detached from the plural graduation parts 2213 and not contacted with the plural graduation parts 2213. Under this circumstance, as shown in FIG. 4, the scroll wheel module 22 is in a first rotation mode (i.e., a hyper-fast mode).

While the adjusting key 231 is moved to a second position P2, the first end of the switching arm 232 is correspondingly swung with the adjusting key 231, and the second end of the switching arm 232 is swung within the accommodation channel 2212. Consequently, the second end of the switching arm 232 is contacted with at least one of the plural graduation parts 2213. Under this circumstance, as shown in FIG. 5, the scroll wheel module 22 is in a second rotation mode (i.e., a stepped motion mode).

As mentioned above, the plural weighing elements 222 are accommodated within the wheel body 221 of the scroll mouse 1, so that the weight of the wheel body 221 is increased. Consequently, when the scroll wheel module 22 is in the first rotation mode, the rotating speed of the wheel body 221 is much faster than the rotating speed of the conventional scroll wheel 13. Moreover, the time length of continuously rotating the wheel body 221 at the high speed is longer than the time length of continuously rotating the conventional scroll wheel 13.

Figure 6:
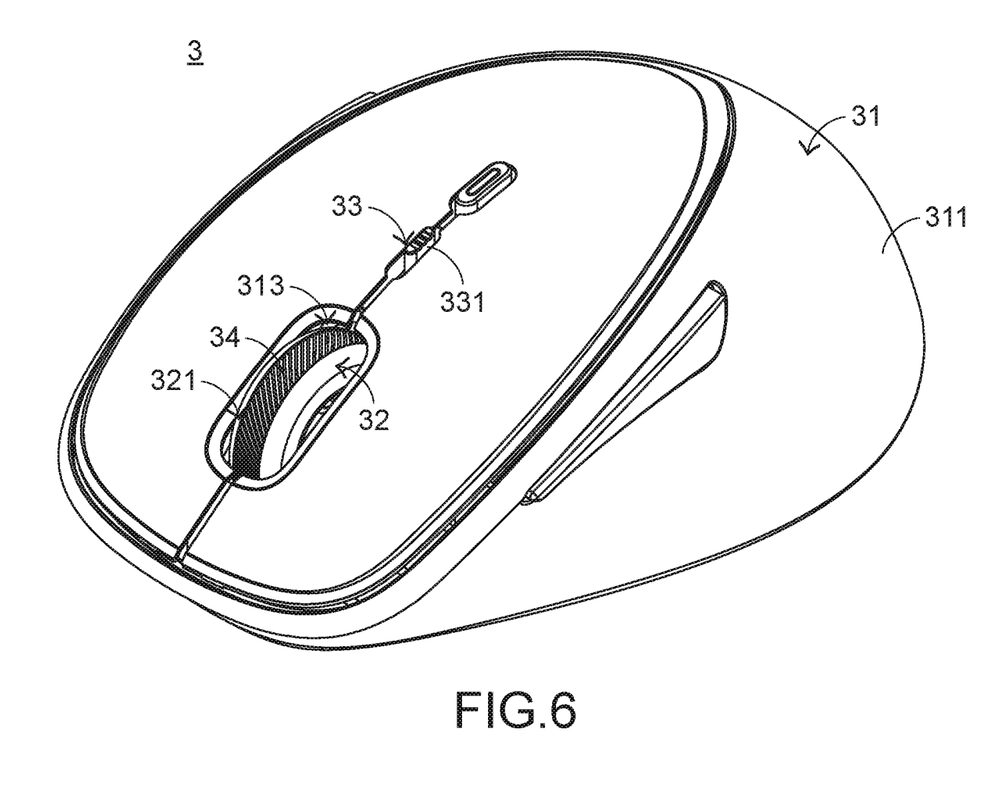
FIG. 6 is a schematic perspective view illustrating the outer appearance of a scroll mouse according to a second embodiment of the present invention.
Figure 7:
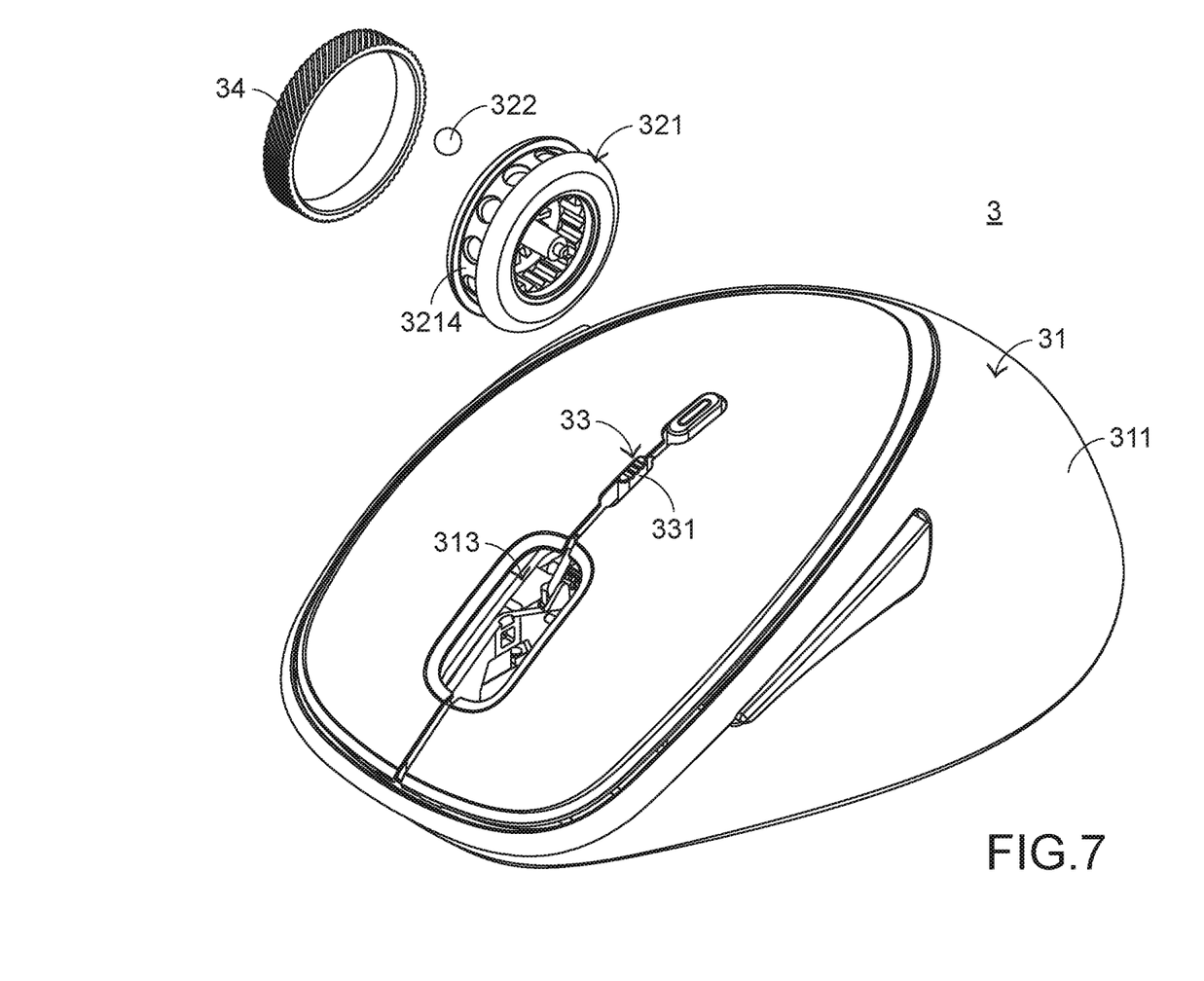
FIG. 7 is a schematic exploded view illustrating a portion of the scroll mouse according to the second embodiment of the present invention.

The present invention further provides a second embodiment, which is distinguished from the first embodiment. Hereinafter, the structure of the scroll mouse of the present invention will be illustrated with reference to FIGS. 6 and 7. FIG. 6 is a schematic perspective view illustrating the outer appearance of a scroll mouse according to a second embodiment of the present invention. FIG. 7 is a schematic exploded view illustrating a portion of the scroll mouse according to the second embodiment of the present invention. In this embodiment, the scroll mouse 3 comprises a casing 31, a scroll wheel module 32 and a switching module 33. The casing 31 comprises a top cover 311, a base (not shown) and an opening 313. The scroll wheel module 32 comprises a wheel body 321 and plural weighing elements 322. The switching module 33 comprises an adjusting key 331 and a switching arm (not shown). The structures and functions of the components of the scroll mouse 3 which are identical to those of the first embodiment are not redundantly described herein. In comparison with the first embodiment, the scroll mouse 3 further comprises an anti-slip ring 34.

The anti-slip ring 34 is sheathed around the poking surface 3214 of the wheel body 321, and the plural weighing elements 322 are covered by the anti-slip ring 34. Since the weighing elements 322 are hidden by the anti-slip ring 34, the weighing elements 322 are not exposed outside the wheel body 321. Moreover, due to the anti-slip ring 34, the user's finger is not readily slid from the scroll wheel module 32. In an embodiment, the anti-slip ring 34 is made of rubber.

From the above descriptions, the present invention provides a scroll mouse. Since the plural weighing elements are accommodated within the wheel body, the weight of the wheel body is increased. When compared with the conventional mouse device, the rotating speed of the wheel body of the present scroll wheel module is faster and the time length of continuously rotating the wheel body at the high speed is longer. Consequently, the drawbacks of the conventional technologies can be effectively overcome.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scroll mouse, comprising:
   a casing comprising an opening; and
   a scroll wheel module disposed within the casing, penetrated through the opening, and partially exposed outside the casing, wherein the scroll wheel comprises:
     a wheel body disposed within the casing and rotatable relative to the casing, wherein the wheel body comprises plural receiving recesses, and the plural receiving recesses are circumferentially formed in the wheel body; and
     plural weighing elements corresponding to the plural receiving recesses, wherein the plural weighing elements are received within the corresponding receiving recesses to increase a weight of the wheel body, wherein a material density of each weighing element is larger than a material density of the wheel body;
   wherein the casing further comprises:
     plural fixing posts protruded from the casing, wherein the plural fixing posts have respective fixing holes; and
     a supporting seat penetrated through the plural fixing holes and connected with the plural fixing posts, wherein the supporting seat is movable relative to the plural fixing posts in a vertical direction to support the wheel body, and the wheel body is rotatable relative to the supporting seat.

2. The scroll mouse according to claim 1, wherein the wheel body further comprises:
   an accommodation channel; and
   plural graduation parts disposed on an inner surface of the accommodation channel.

3. The scroll mouse according to claim 2, wherein the scroll mouse further comprises a switching module for changing a rotation mode of the scroll wheel module, wherein the switching module comprises:
   an adjusting key disposed on the casing and partially exposed outside the casing; and
   a switching arm, wherein a first end of the switching arm is connected with the adjusting key, and a second end of the switching arm is inserted into the accommodation channel, wherein while the adjusting key is moved, the switching arm is correspondingly swung with the adjusting key, wherein when the adjusting key is moved to a first position, the second end of the switching arm is not contacted with the plural graduation parts, so that the scroll wheel module is in a first rotation mode, wherein when the adjusting key is moved to a second position, the second end of the switching arm is contacted with at least one of the plural graduation parts, so that the scroll wheel module is in a second rotation mode.

4. The scroll mouse according to claim 1, wherein the wheel body comprises:
an accommodation channel;
plural graduation parts disposed on an inner surface of the accommodation channel;
a main part, wherein the accommodation channel, the plural graduation parts and the plural receiving recesses are located at the main part; and
a covering part, wherein the covering part and the main part are combined together to form the wheel body, and the covering part comprises plural concave structures,
wherein after the plural weighing elements are received within the corresponding receiving recesses and the covering part and the main part are combined together, positions of the plural weighing elements are limited by the corresponding receiving recesses, so that the plural weighing elements are not detached from the corresponding receiving recesses.

5. The scroll mouse according to claim 4, wherein the scroll mouse further comprises a switching module for changing a rotation mode of the scroll wheel module, wherein the switching module comprises:
an adjusting key disposed on the casing and partially exposed outside the casing; and
a switching arm, wherein a first end of the switching arm is connected with the adjusting key, and a second end of the switching arm is inserted into the accommodation channel, wherein while the adjusting key is moved, the switching arm is correspondingly swung with the adjusting key
wherein when the adjusting key is moved to a first position, the second end of the switching arm is not contacted with the plural graduation parts, so that the scroll wheel module is in a first rotation mode,
wherein when the adjusting key is moved to a second position, the second end of the switching arm is contacted with at least one of the plural graduation parts, so that the scroll wheel module is in a second rotation mode.

6. The scroll mouse according to claim 1, wherein the wheel body is made of plastic material.

7. The scroll mouse according to claim 1, wherein the weighing element is made of metallic material, glass material or ceramic material.

8. The scroll mouse according to claim 1, wherein the scroll mouse further comprises an anti-slip ring, wherein the anti-slip ring is sheathed around the wheel body, and the plural weighing elements are covered by the anti-slip ring.

9. The scroll mouse according to claim 8, wherein the anti-slip ring is made of rubber.

* * * * *